April 19, 1932.   W. N. BOOTH   1,854,246
METHOD OF MANUFACTURING VEHICLE WHEEL HUB SHELLS
Filed March 23, 1927   5 Sheets-Sheet 1

Inventor
William N. Booth
By Whittemore Hulbert & Whittemore & Belknap
Attorneys April 19, 1932. W. N. BOOTH 1,854,246
METHOD OF MANUFACTURING VEHICLE WHEEL HUB SHELLS
Filed March 23, 1927 5 Sheets-Sheet 3
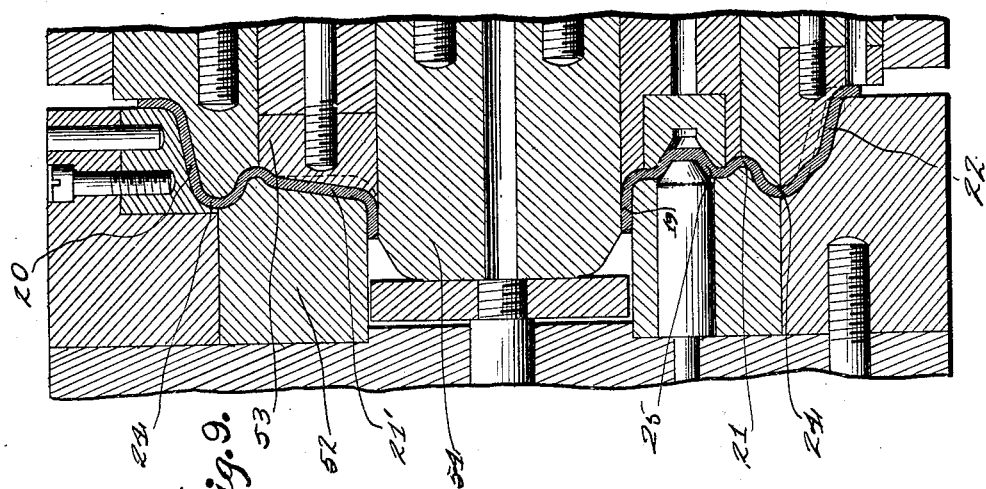
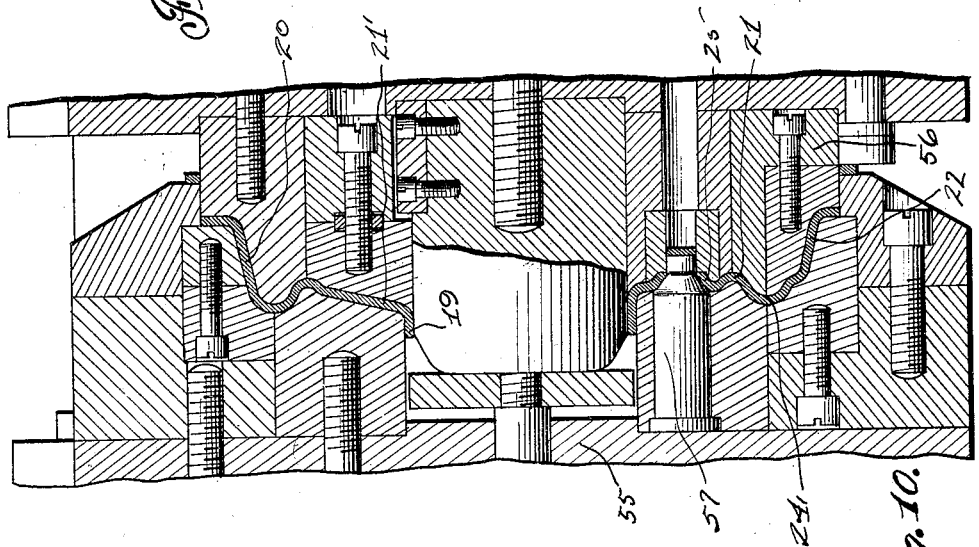
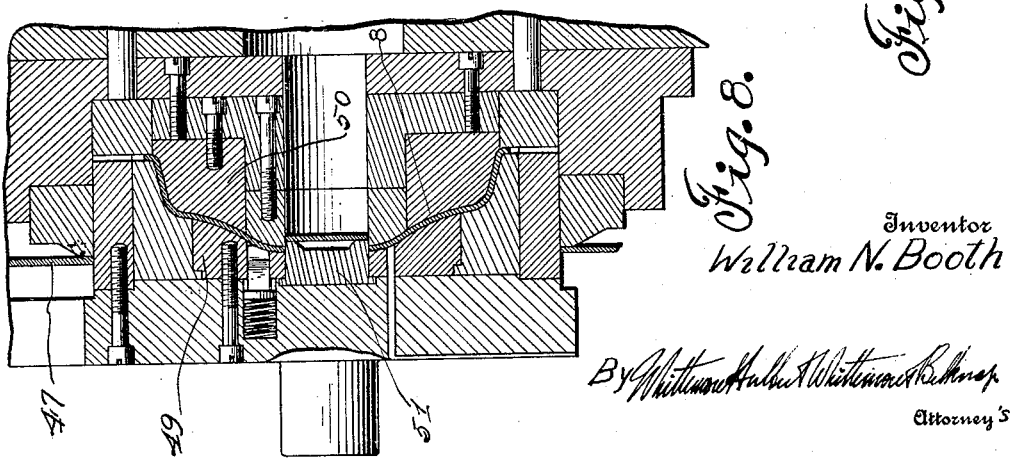
Inventor
William N. Booth

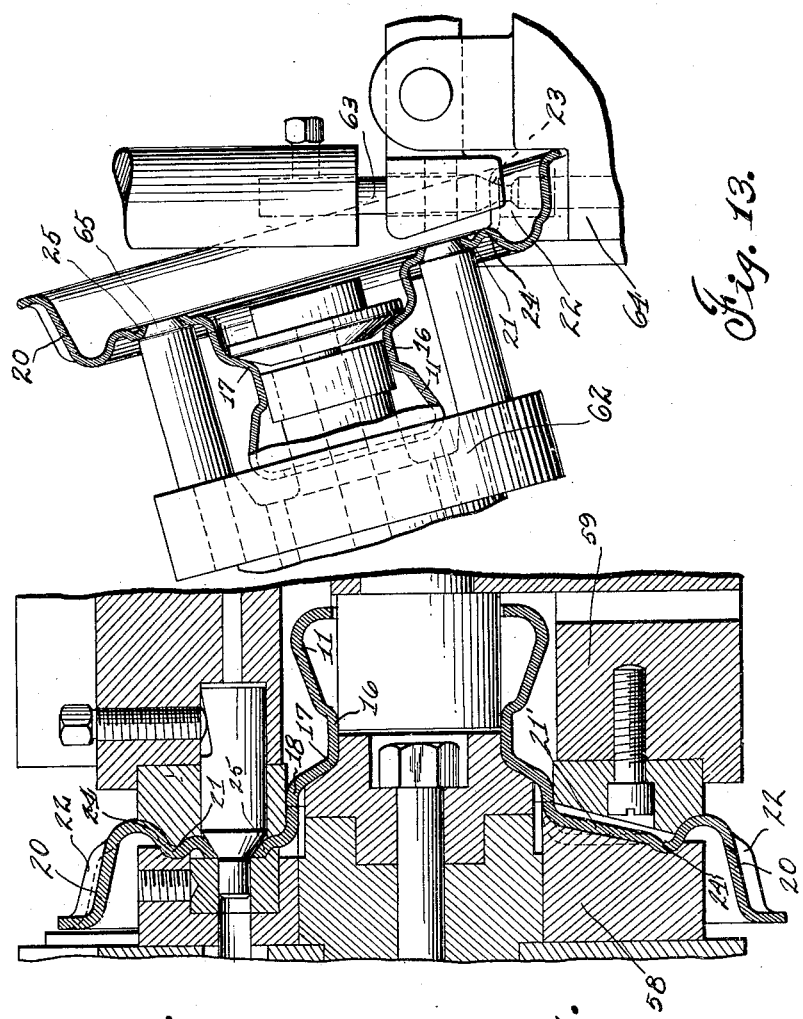

April 19, 1932.  W. N. BOOTH  1,854,246
METHOD OF MANUFACTURING VEHICLE WHEEL HUB SHELLS
Filed March 23, 1927   5 Sheets-Sheet 5

Inventor
William N. Booth
By
Whittemore Hulbert Whittemore & Belknap
Attorney's

Patented Apr. 19, 1932

1,854,246

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

METHOD OF MANUFACTURING VEHICLE WHEEL HUB SHELLS

Application filed March 23, 1927. Serial No. 177,681.

The invention relates to the manufacture of hub shells which are designed particularly for use in vehicle wire wheels. One of the objects of the invention is to so form the hub shell that it has the maximum of strength and resiliency. Another object is to form the hub shell with the least possible number of steps to thereby provide for its economical manufacture. A further object is to so locate the hub shell during various steps in its manufacture that the hub shell may be accurately formed. With these as well as other objects in view, the invention resides in the novel features as more fully hereinafter set forth.

In the drawings:

Figure 1 is a side elevation of a portion of a vehicle wheel with a hub shell made by my method;

Figures 2 and 3 are cross sections respectively on the lines 2—2 and 3—3 of Figure 1;

Figures 8, 9 and 10 illustrate successive steps in the forming of the flange section of the hub shell;

Figures 11, 12, 13, 14 and 15 illustrate various steps in the forming of the two-part hub shell.

Figures 1, 2, 3:
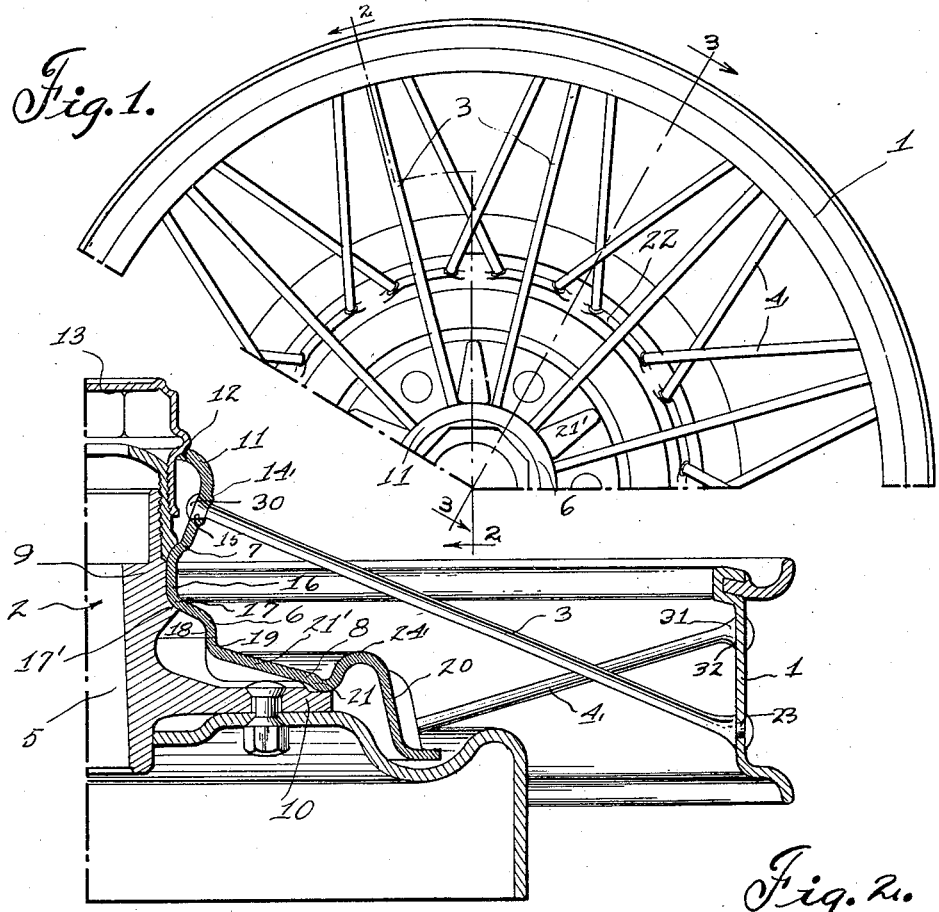

The vehicle wheel shown in Figures 1, 2 and 3 has the rim 1 which, in the present instance, is a tire carrying rim, the hub 2 and the sets of front and rear spokes 3 and 4, respectively. The hub 2 is formed of the inner hub member 5 and the outer hub member or hub shell 6, which latter forms with the rim 1 and sets of spokes 3 and 4 the wheel body. The hub shell 6 is formed of sheet metal and has the barrel and flange sections 7 and 8, respectively, the former being adapted to slidably engage the barrel 9 of the inner hub member and the latter being adapted to engage the radial fixed flange 10 of the inner hub member. The barrel section has at its front or free end the annular bead 11 and the axial opening 12 through which the hub cap 13 of the wheel extends. The annular bead has the series of peripherally spaced bosses 14, each of which has an opening therethrough countersunk from the inner side to form a tapered annular seat 15. The barrel section also has near its rear or fixed end the annular depression 16 which is adapted to slidably engage the barrel of the inner hub member and which also forms the rearwardly facing annular shoulder 17 for engaging the annular shoulder 17' formed upon the barrel of the inner hub member.

The flange section 8 has the inner annular portion 19 registering with and secured to the rear cylindrical end portion 18 of the barrel section, the outer annular portion 20 and the radial portion 21 connecting the inner and outer portions. The outer annular portion extends transversely of the radial portion and is provided with the series of peripherally spaced bosses 22, each having arcuate side walls with each wall provided with an opening therethrough which is countersunk from the inner side to form a tapered annular seat 23. The openings formed in each boss are offset axially of the wheel. The radial portion 21 is provided with the annular rib 24 for contacting with the front face of the fixed radial flange 10 near its outer edge and with the series of tapered annular flanges 25 spaced inwardly from the annular rib 24 and having their outer faces adapted to engage tapered annular walls 26 of the recesses 27 formed in the front face of the fixed radial flange. The radial portion 21 is also provided with the hollow radial reinforcing ribs 21' between the tapered annular flanges 25. The means for securing the hub shell to the inner hub member comprises in the present instance the bolts 28 and the nuts 29, the latter having tapered annular faces for engaging the inner faces of the tapered annular flanges 25. The annular shoulder 17 upon the barrel section 7 and the annular rib 24 and the tapered annular flanges 25 of the flange section 8 are located relative to each other and the seats upon the inner hub member with which they contact so that when securing the hub shell to the inner hub member the annular shoulder first engages its seat, then the annular rib engages its seat and finally the tapered annular flanges engage their seats.

Both the front and rear sets of spokes 3 and 4, respectively have the hemi-spherical heads 30 at their inner ends which are provided with tapered annular shoulders for engaging the tapered annular seats 15 and 23, respectively. These spokes have at their outer ends the enlargements 31 forming shoulders 32 and the tenons 33, the latter extending radially through the rim and having their outer ends riveted over against its outer face. The shoulders 32 are held tightly against the seats upon the rim base and the spokes are under tension.

For the purpose of economically manufacturing the hub shell 6 and at the same time providing for the maximum of strength and resiliency so that it will effectually hold the inner ends of the spokes and function to maintain these spokes under tension, I separately form the barrel and flange sections 7 and 8, respectively, to avoid heating and annealing and consequently secure these sections to each other in fixed relation.

Figure 4:
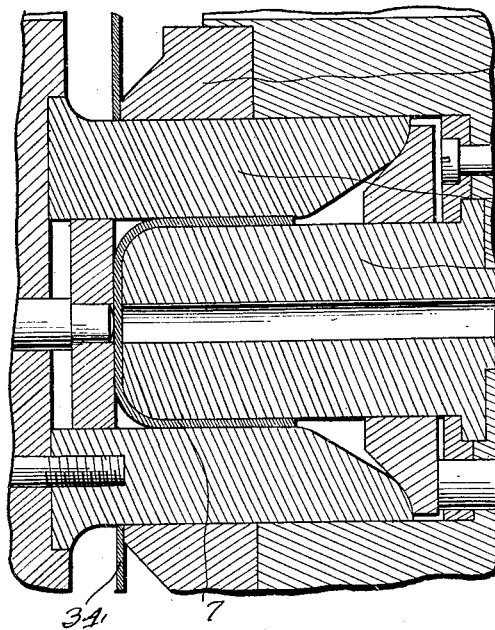
Figures 4, 5, 6 and 7 illustrate successive steps in the forming of the barrel section of the hub shell.
Figure 5:
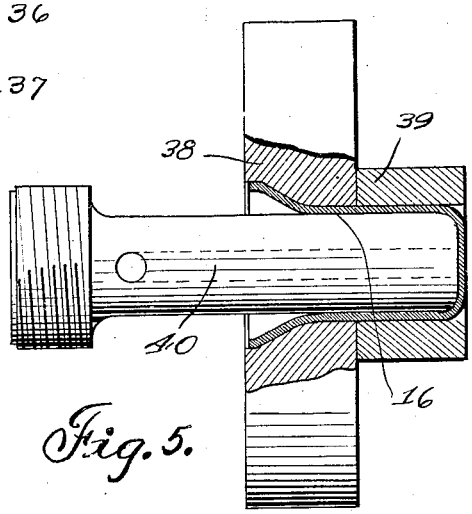
Figure 6:
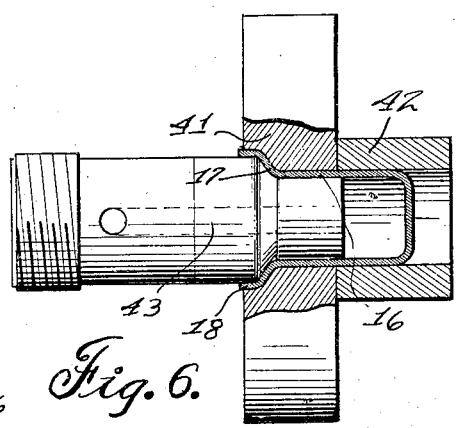

In forming the barrel section 7 of the hub shell, I first blank from a sheet metal strip 34 and then draw the blank to cup-shaped form by suitable dies, 35, 36 and 37 shown in Figure 4. The cup-shaped blank is then reduced as shown in Figure 5 by suitable dies 38 and 39 and the punch 40 to form a cylindrical portion extending from the bottom of the blank and having an internal diameter approximately equal to that of the annular depression 16 in the completed hub shell. At this time a flared end portion is also formed upon the blank. This reduced blank is next operated upon by suitable dies 41 and 42 and the punch 43, as shown in Figure 6, to fashion the flared end portion of the reduced blank into a cylindrical end portion and a tapered annular or frusto-conical portion between the two cylindrical portions. The cylindrical end portion is of approximately the same diameter as the rear or fixed end portion 18 of the barrel section in the completed hub shell while the tapered annular or frusto-conical portion is approximately of the same dimensions and inclination as the annular shoulder 17 at the rear side of the annular depression 16.

Figure 7:
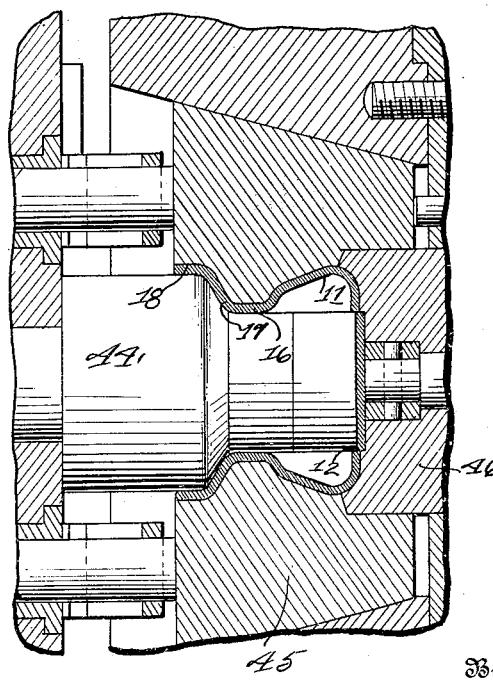

The blank, as completed in Figure 6, is then operated upon in the apparatus shown in Figure 7 to fashion part of its cylindrical portion into the annular bead 11 and to form the axial opening 12. I make use of a suitable liquid such as oil for exerting internal pressure upon the cylindrical portion of the blank and forcing this cylindrical portion outwardly to a position determined by surrounding dies, during which time its length is decreased. As shown, 44 is a punch which is movable axially within the reduced blank of Figure 6 and has portions fitting the cylindrical end portion 18, the tapered annular or frusto-conical portion 17 and the reduced cylindrical portion 16. 45 is an external sectional die surrounding the blank and 46 is an end die engageable with the bottom of the blank. The amount of oil within the blank prior to this step is predetermined so that enlarging of the reduced cylindrical portion to form the annular bead 11 of predetermined size is assured, after which upon continued movement of the punch 44 the bottom of the blank is sheared to form the axial opening 12 for the passage of the hub cap. However, the sheared metal is not completely forced from the end of the barrel section to permit the oil to escape so that upon return of the punch and sectional die to their original positions the barrel section may be removed and the oil then poured out. The sheared metal may then be forced out after which the barrel section formed by these steps has approximately the final dimensions and shape of the barrel section in the completed hub shell.

In forming the flange section 8 of the hub shell, I first blank from a sheet metal strip 47 and then draw the blank to cup-shaped form and form a central or axial opening therein. This is accomplished in the apparatus shown in Figure 8 comprising primarily the cooperating dies 49 and 50 at opposite sides of the blank and the piercing punch 51, the die 50 being in the nature of a punch. After this step the central hole in the cup-shaped blank is preferably machined to avoid cracking the metal during the following step which is carried out in the apparatus shown in Figure 9 and comprising primarily the co-operating dies 52 and 53 upon opposite sides of the cup-shaped blank, the latter being in the nature of a punch and having the central portion 54 for engaging the central opening and drawing the surrounding metal into a cylindrical flange of approximately the same diameter as the inner annular portion 19 in the completed flange section. These cooperating dies 52 and 53 cooperate to form an outer annular portion and peripherally spaced bosses thereon of approximately the same dimensions as the outer annular portion 20 and the bosses 22 of the completed flange section, a radial portion having an annular rib, tapered annular flanges and radial reinforcing ribs of the approximate final dimensions respectively of the radial portion 21 having the annular rib 24, the tapered annular flanges 25 and the radial ribs 21'.

The blank is then operated upon in the apparatus shown in Figure 10 comprising primarily the cooperating dies 55 and 56, the latter being in the nature of a punch, and the piercing punches 57, by means of which the blank is restruck to more accurately dimension its parts, the bottoms of the tapered annular flanges 25 are removed and the outer edge of the terminal flange upon the outer annular portion 20 is trimmed. At this time the blank is of approximate final size and shape.

After this step the inner annular portion 19 of the flange section and the cylindrical end portion 18 of the barrel section are welded together in suitable apparatus, not shown, and the interior flash formed by the weld is then removed as by machining, after which the blank, now comprising the barrel and flange sections rigidly secured to each other, is restruck in the apparatus shown in Figure 11 which essentially comprises the cooperating dies 58 and 59, the latter in the nature of a punch. These dies assure the correct shapes of the sections and positions the rearwardly facing tapered annular or frustoconical shoulder 17 upon the barrel section relative to the rear face of the annular rib 24 upon the flange section and also position the outer faces and rear ends of the tapered annular flanges 25 of the flange section relative to the rear face of the annular rib.

The next step, as shown in Figure 12, comprises positioning the two-part blank in a suitable apparatus, such as a lathe, by holding the rear face of the annular rib 24 of the flange section against a bearing plate 60 of the apparatus and non-rotatably securing the blank to the apparatus by engaging the outer faces of the tapered annular flanges 25 of the flange section with cooperating drivers 61, after which the external flash formed during the welding is removed, the internal diameter of the annular depression 16 of the barrel section is machined to size and the axial opening 12 in the front end of the barrel section is machined to size.

The two-part blank now has accurate dimensions and is in condition to be suitably operated upon to form the spoke openings and seats 23 and 45, respectively, in the outer annular portion of the flange section and the annular bead of the barrel section. As shown in Figure 13, I have provided an apparatus, including a suitable chuck 62, for the blank, a piercing punch 63 and a cooperating die 64. The two-part blank is positioned in the chuck by engaging the tapered annular flanges 25 of the flange section with suitable pilots 65, each having portions extending into these tapered annular flanges and annular shoulders engaging the front face of the metal surrounding these annular flanges to properly position the blank. The blank is suitably indexed and the punch is operated in timed relation to accurately pierce the spoke openings and countersink the same from the inner side of the blank to form the spoke seats 23 in corresponding arcuate walls of the bosses 22 in the outer annular portion 20. After this step, the other side walls of the bosses 22 are punched and countersunk from the inner side of the blank in a suitable apparatus very similar to that shown in Figure 13 and in which the blank is held in proper position in the same manner.

Figure 14:
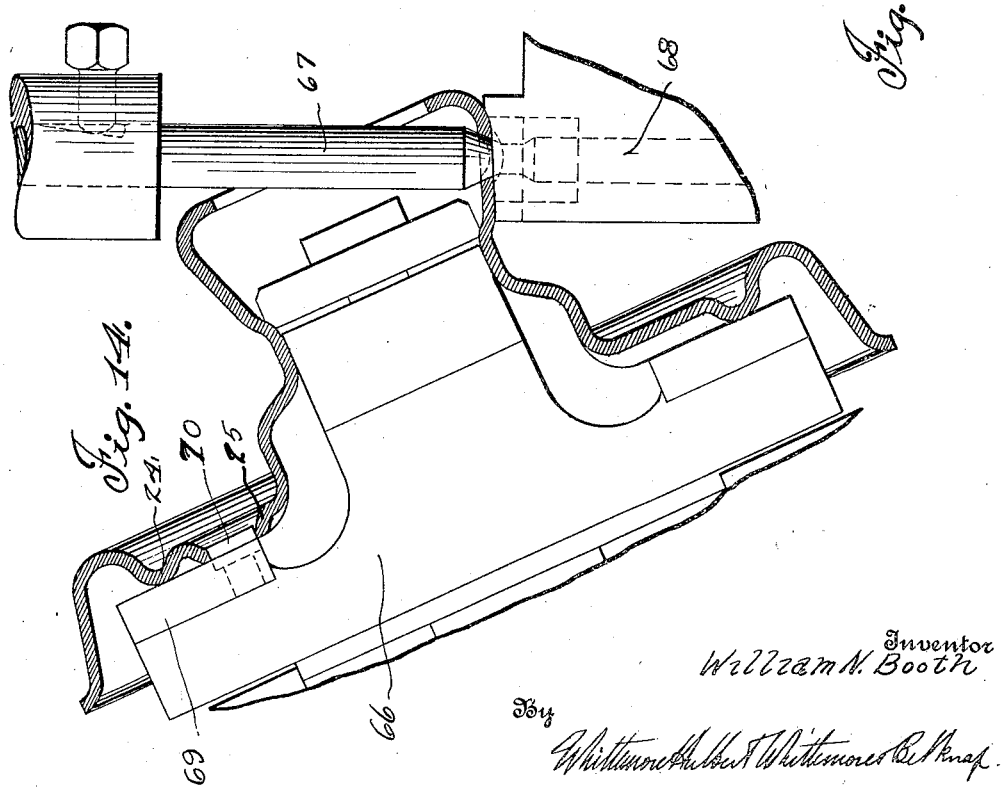

The spoke openings and seats 15 and also the bosses 14 are then formed in the annular bead 11 of the barrel section of the two-part blank, Figure 14 showing a suitable apparatus for the purpose. This apparatus has the chuck 66 for the two-part blank, the punch 67 and the cooperating die 68. The chuck in this instance positions the two-part blank by holding the rear face of the annular rib 24 of the flange section against the bearing member 69 and by also engaging suitable pilots 70 in the tapered annular flanges 25 of the flange section. The punch with the cooperating die, in addition to forming the openings and countersinking from the inner side, also form the bosses upon the annular rib.

It will be seen that the two-part blank is accurately axially positioned during these latter steps. It will also be seen that the two-part blank is accurately peripherally positioned during these latter steps so that the spoke openings and seats in both the annular bead and the outer annular portion are accurately peripherally spaced relative to each other.

Figure 15:
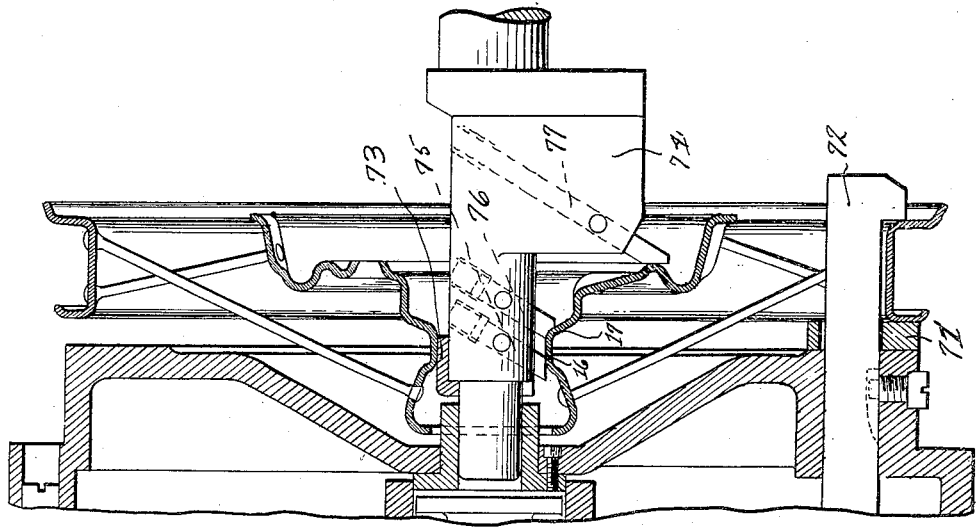

To make sure that the annular shoulder 17 upon the barrel section and the annular rib 24 of the flange section are correctly relatively spaced or positioned and also to make sure that their planes are parallel to the plane of rotation of the wheel and that the inner face of the annular depression 16 of the barrel section is concentric with the axis of rotation of the wheel, I place the wheel, after the spokes have been assembled with the hub shell and the felly, in the apparatus shown in Figure 15. In this apparatus the front flange of the felly is clamped against the abutment ring 71 by the clamps 72 after the wheel has been centered by means of the pilot 73 upon the cutter holder 74. The cutter holder is provided with the cutters 75, 76 and 77, respectively, engageable with the inner face of the annular depression 16, the holder 17 and the rear face of the rib 24.

With the above method, it will be seen that both the barrel and flange sections of the hub shell are formed while in cold condition so that they will present the maximum of strength and resiliency. It will also be seen that the steps are such that the parts may be accurately formed and the steps rapidly carried out.

What I claim as my invention is:

1. The method of manufacturing vehicle wheel hub shells, which includes forming a section of the shell by pressing a flat sheet metal blank into a cup-shaped blank having a cylindrical portion, an enlarged end portion and a connecting portion, applying internal pressure through a liquid medium to part of the cylindrical portion to expand the same, limiting the expansion and finally punching out the central portion of the bottom of the blank.

2. The method of manufacturing wire wheel hub shells having driving projections, which includes forming a hub shell blank with driving projections from flat sheet metal, positioning the blank by means of the driving projections and forming spoke engaging seats in the blank while thus positioned.

3. The method of manufacturing vehicle wheel hub shells having barrel and flange sections each with openings therethrough for wire spokes, the flange section also having driving projections, which includes separately forming the barrel and flange sections, securing the same to each other in fixed relation to form a two-part blank, positioning the two-part blank by means of the driving projections, and forming the openings therein for the spokes while thus positioned.

4. The method of manufacturing vehicle wheel hub shells, which includes pressing a sheet metal blank to cup-shaped form, punching a central opening therein, removing the hardened metal surrounding the central opening and then pressing the cup-shaped blank to form an annular flange surrounding the central opening.

5. The method of manufacturing vehicle wheel hub shells, which includes pressing a sheet metal blank into a barrel section, pressing another sheet metal blank into a flange section with driving projections, securing the sections to each other in fixed relation to form a two-part blank, positioning the two-part blank by means of the driving projections, and forming spoke engaging seats in the sections while thus positioned.

In testimony whereof I affix my signature.

WILLIAM N. BOOTH.